United States Patent [19]

Nelson et al.

[11] Patent Number: 4,613,742

[45] Date of Patent: Sep. 23, 1986

[54] METHOD FOR CUTTING IMAGING SHEETS CONTAINING PHOTOSENSITIVE MICROCAPSULES

[75] Inventors: Erik K. Nelson, Centerville; Donald L. Head, Chillicothe, both of Ohio

[73] Assignee: The Mead Corporation, Dayton, Ohio

[21] Appl. No.: 710,721

[22] Filed: Mar. 11, 1985

[51] Int. Cl.⁴ .......................... B23K 26/00; G01C 1/72
[52] U.S. Cl. ................... 219/121 LG; 219/121 LM; 219/121 LN; 430/138
[58] Field of Search ................ 219/121 LG, 121 LN, 219/121 LM, 121 EM; 430/138, 211, 345

[56] References Cited

U.S. PATENT DOCUMENTS

| 4,386,145 | 5/1983 | Gilmour | 430/138 |
| 4,468,534 | 8/1984 | Boddicker | 219/121 LG |
| 4,508,807 | 4/1985 | Adair | 430/138 |
| 4,533,615 | 8/1985 | Arney et al. | 430/138 |
| 4,536,463 | 8/1985 | Sanders | 430/138 |

Primary Examiner—M. H. Paschall
Attorney, Agent, or Firm—Biebel, French & Nauman

[57] ABSTRACT

A method and apparatus for cutting imaging sheets including a layer of photohardenable microcapsules without discoloring along the cut edge wherein the line along which the sheet is to be cut is exposed to actinic radiation.

6 Claims, 2 Drawing Figures

METHOD FOR CUTTING IMAGING SHEETS CONTAINING PHOTOSENSITIVE MICROCAPSULES

BACKGROUND OF THE INVENTION

The present invention relates to a method for cutting imaging sheets of the type described in U.S. Pat. Nos. 4,440,846 and 4,399,209 to The Mead Corporation. More particularly, it relates to a method for cutting imaging sheets wherein the microcapsules contain photo-hardenable compositions.

U.S. Pat. Nos. 4,440,846 and 4,399,209 describe an imaging system wherein a photosensitive layer comprising microcapsules containing a photosenseentive composition in the internal phase is image-wise exposed to actinic radiation and subjected to a uniform rupturing force whereupon the microcapsules rupture and image-wise release the internal phase. The imaging system is particularly advantageous because it is a totally dry system and does not rely upon the application of wet development processing solutions to produce the image. An image-forming chromogenic material, such as a substantially colorless color former, is typically associated with the microcapsules. When the microcapsules rupture, the color former image-wise reacts with a developer material and produces a color image.

U.S. Pat. No. 4,399,209 describes a transfer imaging system wherein the developer material is provided on a separate support which is assembled with the imaging sheet following exposure. When the microcapsules are ruptured, the image-forming agents in the microcapsules are transferred to the developer sheet where the image is formed. U.S. Pat. No. 4,440,846 describes a self-contained imaging sheet wherein the developer is in a contiguous layer on the same surface of the sheet as the photosensitive microcapsules.

SUMMARY OF THE INVENTION

It is anticipated that the imaging sheets described above will be manufactured as large sheets which will have to be cut to a size appropriate for a particular end use. For example, for many applications the sheets will be cut to standard paper sizes whereas in other applications, such as in reproducing engineering drawings or in computer assisted design, the sheets could be much larger.

A problem arises in cutting imaging sheets in which the microcapsules contain photohardenable compositions. The internal phase of an unexposed photohardenable microcapsule is fluid. As the sheet is cut, the capsules rupture and release the image forming agents. Particularly in the case of self-contained imaging sheets, but also in transfer systems, the image-forming agents released from the capsules react with the developer on the cut line. This results in the edges of the sheets along the cut lines being colored.

A principal object of the present invention is to provide a method for cutting imaging sheets without producing a colored cut edge.

In accordance with the present invention, the line along which the imaging sheet material is to be cut is exposed to a finely focused beam of actinic radiation. Depending upon the sensitivity of the imaging sheet, this beam can be a finely focused beam of light, a finely focused beam of ultraviolet radiation, or a laser. The actinic radiation hardens the internal phase of the microcapsules and prevents them from releasing the internal phase and its associated image forming agents when the sheet is cut.

One embodiment of the present invention resides in a method for cutting an imaging sheet material which includes a support carrying a layer of microcapsules containing a photohardenable composition. That method comprises:

exposing the imaging sheet material to actinic radiation along a line upon which the imaging sheet material is to be cut, and cutting the imaging sheet material along that line.

Another embodiment of the invention resides in an apparatus useful in cutting an imaging sheet material including a support and a layer of microcapsules containing a photohardenable composition comprising means for exposing said imaging sheet material to actinic radiation along a line at which said imaging sheet material is to be cut, and means for cutting said imaging sheet material.

DETAILED DESCRIPTION OF THE INVENTION

Figure 1:
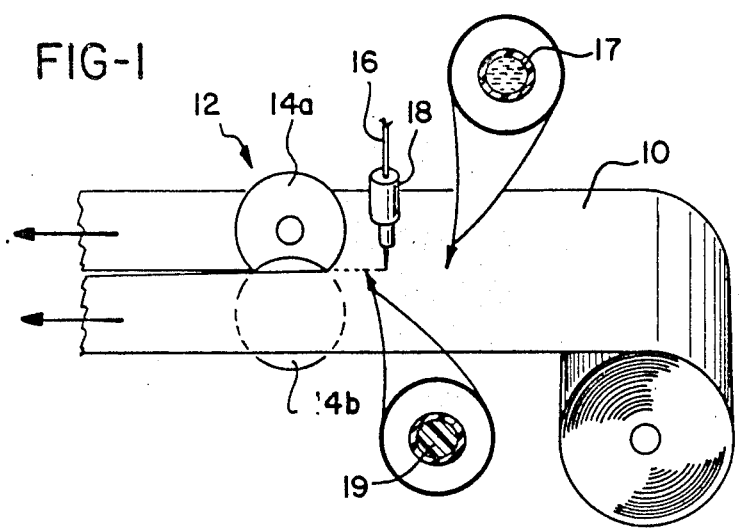
FIG. 1 is a schematic illustration of one method for cutting imaging sheets in accordance with the present invention.

FIG. 1 illustrates one apparatus for cutting imaging sheets in accordance with the present invention. There, a web of an imaging sheet material 10 is conveyed to a cutter 12 where the sheet is cut by a pair of opposed circular knives 14a and 14b. Knives 14a and 14b rotate at an angle to one another so as to produce a scissoring action between them which cuts the imaging sheet. Immediately upstream of the knives 14a and 14b is a source 16 of finely focused actinic radiation. Prior to passing source 16, the microcapsules on the imaging sheet contain a liquid internal phase as shown at 17. If source 16 were not present, as the photosensitive material passed circular knives 14a and 14b, the microcapsules would be ruptured either through slicing the microcapsules or the concomitant pressure. Irradiation from source 16, however, hardens the internal phase of the microcapsules as shown at 19 and thereby prevents the capsules from rupturing.

Figure 2:
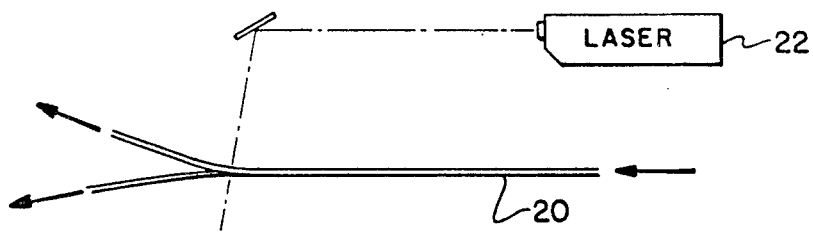
FIG. 2 is a schematic illustration of another method for cutting imaging sheets in accordance with the present invention using a laser.

In FIG. 1, the radiation is focused onto the imaging sheet 10 by an optical fiber bundle 18. Other means by which the radiation source can be focused on the imaging sheet material may also be used. For example, a lens systems can be used. Alternatively, a mask consisting of a radiation absorbing sheet having an aperture therein the width of the cut line can be placed over the imaging sheet material such that the cut line is exposed as it passes thereunder. The source 16 can also be a laser, the beam of which is focused on the sheet. With an appropriate laser, it may even be possible to simultaneously expose and cut the imaging sheet as shown in FIG. 2. There, a web of imaging sheet material 20 passes through the beam of laser 22. The laser functions to both harden the internal phase of the microcapsules and cut the imaging sheet.

Those skilled in the art will appreciate that there are numerous other arrangements whereby the imaging sheet can be cut along a pre-exposed cutting line in accordance with the present invention.

While the process and apparatus herein described constitute the preferred embodiments of the invention, it is to be understood that the invention is not limited to this precise process and apparatus and that changes may be made therein without departing from the scope of the invention which is defined in the appended claims.

What is claimed is:

1. A method for cutting an imaging sheet material which includes a support carrying a layer of microcapsules containing a photohardenable composition comprising:

exposing said imaging sheet material to actinic radiation along a line upon which said imaging sheet material is to be cut to harden said photohardenable composition, and cutting said imaging sheet material along said line.

2. The method of claim 1 wherein said imaging sheet material is exposed along said line to a finely focused beam of actinic radiation.

3. The method of claim 3 wherein said actinic radiation is visible light.

4. The method of claim 2 wherein said actinic radiation is ultraviolet radiation.

5. The method of claim 2 wherein said actinic radiation is a laser.

6. The method of claim 5 wherein said imaging sheet material is simultaneously exposed and cut by said laser.

* * * * *